(12) United States Patent
Fujita et al.

(10) Patent No.: US 6,656,349 B1
(45) Date of Patent: Dec. 2, 2003

(54) HYDROPROCESSING CATALYST AND PROCESS

(75) Inventors: Katsuhisa Fujita, Niihama (JP); Masafumi Shimowake, Niihama (JP); Tetsuro Kamo, Niihama (JP)

(73) Assignees: Nippon Ketjen Co., Ltd., Chuo-ku (JP); Akzo Nobel N.V., Arnhem (NL)

( * ) Notice: Subject to any disclaimer, the term of this patent is extended or adjusted under 35 U.S.C. 154(b) by 0 days.

(21) Appl. No.: 09/710,939

(22) Filed: Nov. 13, 2000

Related U.S. Application Data

(63) Continuation of application No. PCT/EP99/03264, filed on May 11, 1999.

(30) Foreign Application Priority Data

May 11, 1998 (JP) .......................................... 10-127007

(51) Int. Cl.⁷ .......................... B01J 23/84; C10G 45/60
(52) U.S. Cl. .......................... 208/216 PP; 208/216 R; 208/217; 208/251 R; 208/251 H; 502/210; 502/211; 502/213; 502/313; 502/315; 502/321
(58) Field of Search .......................... 502/305, 313, 502/315, 321, 439, 355, 210, 211, 213; 208/213, 216 R, 216 PP, 217, 251 R, 251 H

(56) References Cited

U.S. PATENT DOCUMENTS

| | | | | |
|---|---|---|---|---|
| 3,873,470 A | * | 3/1975 | Conway et al. | 208/216 R |
| 3,898,155 A | * | 8/1975 | Wilson | 208/216 PP |
| 3,925,197 A | * | 12/1975 | Van Klinken et al. | 208/216 PP |
| 3,960,712 A | * | 6/1976 | Conway | 208/216 R |
| 4,003,828 A | * | 1/1977 | Eberly, Jr. | 208/251 H |
| 4,257,922 A | * | 3/1981 | Kim et al. | 208/216 PP |
| 4,353,791 A | * | 10/1982 | Pellet | 208/10 |
| 4,395,328 A | * | 7/1983 | Hensley et al. | 208/216 PP |
| 4,411,771 A | * | 10/1983 | Bambrick et al. | 208/112 |
| 4,547,485 A | | 10/1985 | Bowes | |
| 4,549,957 A | * | 10/1985 | Hensley et al. | 208/216 PP |
| 4,981,832 A | | 1/1991 | Tawara et al. | 502/314 |
| 5,472,928 A | | 12/1995 | Scheuerman et al. | |

FOREIGN PATENT DOCUMENTS

| | | | | |
|---|---|---|---|---|
| EP | 0 704 239 | 4/1996 | | B01J/23/85 |

* cited by examiner

*Primary Examiner*—Tom Dunn
*Assistant Examiner*—Christina Ildebrando
(74) *Attorney, Agent, or Firm*—Louis A. Morris

(57) ABSTRACT

The invention relates to a spherical catalyst composition comprising a Group VI metal component and optionally a Group VIII metal component on a carrier, which catalyst has a particle size of 0.5–7 mm, a total pore volume of 0.5–1.3 ml/g, an average pore diameter of 15–30 nm, and a % PV(>100 nm) of 2–30%, there being substantially no difference in density between the core region of the carrier particles and their surface regions. The catalyst is particularly suitable for use in non-fixed bed processes for the hydroprocessing of heavy hydrocarbon feeds. It has high hydrodesulfurization and hydrodemetallization activity in combination with a high abrasion resistance.

18 Claims, No Drawings

HYDROPROCESSING CATALYST AND PROCESS

CROSS REFERENCE TO RELATED APPLICATIONS

The present invention claims priority of International Application Number: PCT/EP99/03264, filed on May 11, 1999 that claims priority of Japanese Application H10-127007, filed May 11, 1998.

BACKGROUND OF THE INVENTION

1. Field of the Invention

The present invention pertains to a catalyst which is particularly suitable to effect hydroprocessing of heavy hydrocarbon feeds. Although the catalyst is suitable for application in fixed bed processes, it is particularly suitable for application in moving or ebullated bed processes. The present invention also pertains to a process for hydroprocessing hydrocarbon feeds with said catalyst.

2. Prior Art

One of the steps in the preparation of ready-for-use products from heavy hydrocarbon oil fractions is hydroprocessing to effect the complete or partial removal of impurities. Heavy feedstocks, such as feeds based on atmospheric residual oils, vacuum residual oils, tar sand oils, and shale oils generally contain organic sulfur compounds and metallic components. These impurities can be removed by contacting the feedstock with a hydroprocessing catalyst at elevated temperature and pressure in the presence of hydrogen. This will cause the organic sulfur compound to be converted to $H_2S$, while the metals precipitate on the catalyst particles. The catalysts which are to effect this combined hydrodesulfurization and hydrodemetallization have to satisfy quite stringent requirements. On the one hand, the hydrodesulfurization and hydrodemetallization activity of the catalyst should be high, while on the other, the catalyst should have a long life.

Additionally, the use of non-fixed bed processes, such as moving bed processes and ebullated bed processes, is becoming increasingly important in the hydroprocessing of heavy hydrocarbon feedstocks. Non-fixed bed processes have the advantage that it is not necessary to replace the complete catalyst inventory at the same time. Additionally, the contamination of the catalyst inventory with contaminant metals will be more homogeneous. However, the use of a catalyst in a non-fixed bed application places additional requirements on the properties of the catalyst. In particular, the strength and abrasion resistance of the catalyst become more critical, because the catalyst particles suffer more wear and tear by colliding with each other and with the walls of the unit. In consequence, the conventional extrusion-shaped catalyst particles are less suitable for use in non-fixed bed processes, because these particles have corners that may easily wear down in these applications. Further, because the catalyst is continuously or intermittently fed to or removed from the reactor, it must have such a form as to allow easy flowing and transfer as a slurry containing the reacting substances.

Therefore, there is a continuing need for hydroprocessing catalysts which are suitable for use in fixed bed applications, but in particular in non-fixed bed applications, which show a high hydroprocessing activity in the hydroprocessing of heavy hydrocarbon feeds, in particular for effecting simultaneous hydrodemetallization and hydrodesulfurization of such feeds, in combination with a high abrasion resistance and a long life. The present invention provides such a catalyst.

SUMMARY OF THE INVENTION

In one embodiment the present invention is directed to a spherical catalyst composition comprising a Group VI metal component and optionally a Group VIII metal component on a carrier, which catalyst has a particle size of 0.5–7 mm, a total pore volume of 0.5–1.3 ml/g, an average pore diameter of 15–30 nm, and a % PV(>100 nm) of 2–30%, there being substantially no difference in density between the core region of the carrier particles and their surface regions.

In a second embodiment, the present invention comprises a spherical catalyst carrier, which has a particle size of 0.5–7 mm, a total pore volume of 0.5–1.3 ml/g, an average pore diameter of 15–30 nm, and a % PV(>100 nm) of 2–30%, there being substantially no difference in density between the core region of the carrier particles and their surface regions.

Other embodiments of the invention encompass details about the making of the spheres, the properties of the spherical oxide particles, metal components of the hydroprocessing catalyst and the use of the catalyst in a process for the hydroprocessing of a hydrocarbon feed, etc., all of which are hereinafter disclosed in the following discussion of each of the facets of the present invention.

DETAILED DESCRIPTION OF THE INVENTION

The Group VI metal is preferably selected from molybdenum, tungsten, or mixtures thereof, with molybdenum being particularly preferred. The Group VI metal preferably is present in an amount of 1–10 wt. %, calculated as trioxide, preferably 1–7 wt. %.

Optionally, the catalyst may also contain a Group VIII metal component. If such a component is present, it preferably is selected from nickel, cobalt, or mixtures thereof. If it is present, it preferably is present in an amount of 0.1–3 wt. % of a Group VIII metal component, more in particular 0.1–2.5 wt. %, calculated as oxide.

Additional active components such as phosphorus or boron may also be present in the catalyst composition of the present invention. In particular, if the catalyst does not contain a Group VIII metal component it is preferred for it to comprise a small amount of phosphorus, preferably in an amount of 0.1–5 wt. %, more preferably 0.5–3 wt. %, calculated as $P_2O_5$.

The catalyst carrier preferably comprises alumina, silica, titania, zirconia, or a mixture thereof. Other materials which may be present in the catalyst carrier include zeolites, natural fibrous minerals such as sepiolite, attapulgite and halloysite, and natural or synthetic materials such as hectorites or saponites. It is preferred for the catalyst carrier to consist essentially of alumina and silica, the wording "consists essentially of" being intended to mean that minor amounts of other components may be present, as long as they do not influence the catalytic activity of the catalyst. Preferably, the catalyst carrier comprises at least 50% of alumina, more preferably at least 70%, most preferably at least 85%. Most preferably, the catalyst carrier consists essentially of alumina.

The catalyst of the present invention is spherical. In the context of the present specification the term "spherical catalyst" is intended to refer to a catalyst of which the particles meet the following requirement: [D]-[d]<0.2*[D], wherein [D] stands for the average greatest diameter of 100 randomly selected particles and [d] stands for the average smallest diameter of 100 randomly selected particles.

Preferably, the particles meet the requirement that [D]-[d] <0.15*[D]. The more spherical the catalyst particles are, the better they will function in moving and ebullated bed processes.

The particle size distribution of the spherical oxide particles prepared by the process according to the invention preferably is such that at least 80%, more preferably at least 90%, most preferably at least 95%, of the particles has a diameter within a range of 20% below the number average particle diameter to 20% above the number average particle diameter, more preferably within a range of 10% below the average particle diameter to 10% above the average particle diameter.

It is essential that the spherical catalyst of the invention shows substantially no difference in density between the surface portion of the catalyst particle and the core portion of the particle. This can be confirmed by way of a transmission electron microscopy picture at a magnification of 10,000:1 of the cross-section over the centre of a sample particle. There being no difference in density between the surface portion of the particles and their core portion results in catalyst particles with high abrasion resistance and breakage strength. The high abrasion resistance of the particles is reflected in a low wear rate, which is determined as follows: 50 g of a sample are put into a cylindrical can with a diameter of 20 cm and bent by 90 degrees, and the can is rotated for 30 minutes to measure the rate at which dust was produced by abrasion. The wear rate of the catalyst particles of the invention is below 0.5 wt. %, preferably below 0.1 wt. %.

Further, there being no density difference between the surface portions of the catalyst particles and their core portions ensures that the large molecules present in the heavy hydrocarbon fractions to be treated with the catalyst of the present invention can easily enter the catalyst particles. This results in better hydroprocessing characteristics and less coke formation. Additionally, the distribution of contaminant metals through the catalyst particles will be more homogeneous, which may lead to a longer catalyst life.

The catalyst of the present invention has an average pore diameter of 15–30 nm, preferably 17–25 nm, more preferably 18–22 nm. In the context of the present specification the average pore diameter is defined as the pore diameter at which half of the pore volume of the catalyst is present in pores with a diameter below this value and the other half of the pore volume is present in pores with a diameter above this value. The pore size distribution from which this data is derived is determined by way of mercury intrusion at a contact angle of 140°.

If the average pore diameter of the catalyst is either above 30 nm or below 15 nm, the catalyst will not give the desired results in the hydrotreating of heavy hydrocarbon feeds. More in particular, if the average pore diameter is too low, the hydrodemetallization activity of the catalyst will be too low. Further, a too low average pore diameter will lead to a decreased diffusion of the heavy feed components and to blocking of the pores, which will lead to a decreased catalyst life. If the average pore diameter is too high, the surface area of the catalyst will become unacceptably low. This will lead to a decreased activity.

The catalyst of the present invention has 2–30% of its pore volume in pores with a diameter above 100 nm, the so-called macropores, preferably 10–30%, more preferably 15–25%. A lower percentage of macropore volume will lead to a catalyst with decreased activity in the hydrotreating of the heavy hydrocarbon feeds of the present invention, because the macropores function as channels for the large molecules, such as asphaltenes, which are present in the heavy hydrocarbon feeds. Further, the catalyst life will decrease. A higher percentage of macropore volume will lead to a catalyst of decreased strength. Further, since a high amount of macropore volume is accompanied by a lower surface area, a higher percentage of macropore volume will result in a decrease in activity.

The pore volume of the catalyst according to the invention is 0.5–1.3 ml/g, preferably 0.6–1.0 ml/g. If the pore volume of the catalyst is too high, its strength and volume activity will be affected. Further, if the total pore volume of the catalyst becomes too high, the catalyst bulk density decreases to a level which causes the loading density of the reactor to become insufficient. If it is too low, the accessibility of the catalyst will be affected, and the catalyst pores are soon filled with the contaminant metals that precipitate on the catalyst as a result of the hydrodemetallization reaction. This results in a decreased catalyst life.

The catalyst according to the invention generally has a surface area as determined by way of nitrogen adsorption in the range of 100 to 220 $m^2/g$, preferably between 110 and 140 $m^2/g$. A surface area below 100 $m^2/g$ will lead to a low hydrodesulfurization activity. On the other hand, a surface area above 220 $m^2/g$ can generally not be combined with the requirement that the average pore diameter should be above 15 nm.

The catalyst has a particle size of 0.5–7 mm. The preferred catalyst particle size within this range will depend on the use envisaged. At present, a particle size of 2–7 mm is generally preferred.

The crucial point in preparing the catalyst of the present invention resides in the fact that the preparation method should be selected so that a catalyst is obtained wherein there is substantially no difference in density between the core region of the carrier particles and their surface regions. One way of obtaining such particles is the oil drop method, which is well known in the art. A further method is by way of a process comprising the steps of shaping a starting material comprising an oxide hydrate into particles of substantially constant length by leading the material to a set of two rolls rotating towards each other, followed by leading the material to a roll equipped with grooves to form rod-type shapes, cutting the rod-type shapes into particles of substantially constant length, converting the thus formed particles into spheres, and heating the particles to convert the oxide hydrate into an oxide. This method will be illustrated in the examples. Conventional extrusion techniques followed by rounding off of the particles generally will not lead to particles with the required homogeneous density. Generally, these methods lead to particles with a dense shell surrounding a less dense core. However, it is suspected that extrusion techniques in which special care is taken as to the water content of the mass to be extruded and the pressure under which the extrusion is carried out may lead to particles with the required homogeneous density.

Group VI metal components and/or a Group VIII metal components are incorporated into the catalyst carrier in a conventional manner, e.g., by impregnation, and/or by incorporation into the support material before it is shaped into spherical particles. The metal components can be incorporated into the catalyst composition in the form of suitable precursors. For the Group VIB metals, ammonium heptamolybdate, ammonium dimolybdate, and ammonium tungstenate may be mentioned as suitable precursors. Other compounds, such as oxides, hydroxides, carbonates, nitrates, chlorides, and organic acid salts, may also be used. For the Group VIII metals, suitable precursors include oxides, hydroxides, carbonates, nitrates, chlorides, and organic acid salts. Carbonates and nitrates are particularly suitable. The impregnation solution, if applied, may contain a phosphorus compound, such as phosphoric acid, to enhance the stability of the solution. Other compounds the use of which is known in the art, such as organic acids such as citric acid, may also be present. It will be clear to the skilled man that there is a wide range of variations on this method. Thus, it is possible to apply a plurality of impregnating steps, the impregnating solutions to be used containing one or more of the component precursors that are to be deposited, or a portion thereof. Instead of impregnating techniques, dipping methods, spraying methods, etc. can be used. In the case of multiple impregnation, dipping, etc., drying and/or calcining may be carried out in between.

After the active metals have been incorporated into the catalyst composition, it is optionally dried at 50–200° C., and subsequently calcined at 350–750° C., preferably 400–700° C. The drying is done to physically remove the deposited water. It can be done under the same conditions as indicated earlier. The calcining is done to bring at least part, preferably all, of the metal component precursors to the oxide form.

It is advisable to convert the catalyst, i.e., the metal components present therein, into the sulphidic form prior to its use in the hydroprocessing of hydrocarbon feedstocks. This may be done in an otherwise conventional manner, e.g., by contacting the catalyst in the reactor at increasing temperature with hydrogen and a sulfur-containing feedstock, or with a mixture of hydrogen and hydrogen sulphide.

The catalyst of the present invention can be used in the hydroprocessing of hydrocarbon feedstocks. The term hydroprocessing refers to the conversion of a hydrocarbon feedstock in the presence of hydrogen. It includes, but is not limited to, hydrogenation, hydrodesulfurization, hydrodenitrogenation, hydrodemetallization, and hydrocracking. The catalyst can be used in fixed bed, moving bed, or ebullated bed processes. The use of the catalyst of the present invention in moving bed or ebullated bed applications is especially advantageous, because in these processes the abrasion resistance of the catalyst is especially important. The present invention also relates to a process for hydroprocessing of hydrocarbon feeds using the catalyst of the present invention, which process may be a fixed bed process, but preferably is a moving bed or ebullated bed process.

The feedstocks to be treated in the process according to the invention particularly are heavy hydrocarbon feedstocks, more in particular feedstocks containing substantial amounts of metals and sulfur. Examples of suitable feedstocks are metal-containing petroleum crude oil, atmospheric or vacuum distillate, atmospheric or vacuum residue, solvent-deasphalted oil, heavy cycle petroleum stock, visbreaker oil, shale oil, liquid derived from coal, tar sand, etc. Especially preferred hydrocarbon feedstocks include petroleum crudes and atmospheric or vacuum residue. Generally, the boiling range of suitable feedstocks is such that at least 70% by volume will boil above 450° C. The initial boiling point will generally be 300° C., frequently 350° C. The sulfur content of the feed is generally above 0.1 wt. % and will frequently be more than 1 wt. %. The nitrogen content is generally above 500 ppm and will frequently be in the range of 500 to 4000 ppm. The feedstock contains contaminant metals such as vanadium, nickel, and iron, generally in amounts above 3 ppm, frequently in the range of 30 to 3500 ppm, and more frequently in the range of 100–1000 ppm, calculated as metal.

The catalyst of the present invention shows excellent performance in the hydroprocessing of these oils, in particular to effect simultaneous hydrodemetallization and hydrodesulfurization.

The process according to the invention can be carried out under conventional hydroprocessing conditions, which include a temperature of 300–450° C., preferably 340–410° C., a hydrogen partial pressure of 20–220 bar, preferably 100–200 bar, and a liquid hourly space velocity of 0.1–10 h−1, preferably 0.2–2.0 h−1.

EXAMPLE 1

Water was added to 2 kg of a pseudo-boehmite alumina hydrate powder and the mixture was kneaded to obtain an alumina hydrate cake with a water content of 63 wt. % (Step 1).

The alumina hydrate cake was pressed into the clearance between two parallel rolls continuously rotating in an inward direction at a speed of 10 rpm. The alumina hydrate cake was led to a lower third roll equipped with grooves provided at equal intervals and of a width and depth of 2.5 mm, said roll being rotated at 15 rpm, and pressed into the grooves of the lower roll.

The alumina hydrate was removed from the grooves using a toothed plate and passed down the plate in the form of strips. A lubricating oil was applied to the strips. The strips were cut into cubes with a length of about 2.5 mm (Step 2).

The alumina hydrate grains were fed into a turntable granulator operated at 610 rpm. After one minute the spherical material thus formed was taken out of the granulator (Step 3). The spherical particles were then dried at 120° C. and calcined at 800° C. for 2 hours (Step 4).

500 grams of the thus prepared carrier was impregnated by way of pore volume saturation with an impregnation solution comprising molybdenum and nickel. The impregnated carrier was dried at 120° C. for 6 hours in an air current. It was then calcined at 570° C. for 2 hours, to obtain Catalyst A, which contained 4 wt. % of molybdenum, calculated as trioxide, and 0.5 wt. % of nickel, calculated as oxide.

EXAMPLE 2

Example 1 was repeated, expect that 10 ml of 0.1N nitric acid was added to 2 kg of the alumina hydrate cake and the mixture was stirred for 5 minutes before shaping. The thus obtained catalyst was indicated as Catalyst B.

COMPARATIVE EXAMPLE 1

The alumina hydrate cake with a water content of 63 wt. % obtained in Step 1 of Example 1 was further kneaded at 60° C., to achieve a water content of 59%, and moulded using an extrusion moulding machine as described for Comparative Example 1. The moulded articles were dry, short strips irregular in length. They were fed into the turntable granulator used in Example 1. One minute later, many dumbbell-shaped grains had formed, but no large lumps. The pseudo-granular dumbbell-shaped material was dried and calcined as described in Example 1 to obtain Alumina C.

COMPARATIVE EXAMPLE 2

Comparative Example 1 was repeated, except that the extrusion-moulded strips were rotatively granulated for 3 minutes, after which a granular spherical material was obtained. The thus obtained material was indicated as Alumina D.

COMPARATIVE EXAMPLE 3

Example 1 was repeated, expect that 25 ml of 0.1N nitric acid was added to 2 kg of the alumina hydrate cake and the mixture was stirred for 5 minutes before shaping. The thus obtained catalyst was indicated as Catalyst E.

COMPARATIVE EXAMPLE 4

Example 1 was repeated except that the alumina particles were calcined at a temperature of 950° C. The granular catalyst obtained as a result is called Catalyst F.

EXPERIMENTAL RESULTS

Table 1 shows the physical properties of Catalysts A and B and Aluminas C and D produced in Examples 1 and 2 and Comparative Examples 1 and 2 To observe the difference in density between the surface and core portions of each grain of a catalyst, a section across the centre of a sample grain was photographed by a transmission electron microscope with a magnification of 10,000. On the magnified photograph, it was confirmed in the form of alumina clearance whether a 10 to 100-micron layer in the portion containing the outer surface in the sample section was different from the core portion.

To measure the abrasion strength, 50 g of a sample was put into a cylindrical can with a diameter of 20 cm and bent by 90 degrees, and the can was rotated for 30 minutes to measure the rate at which dust was produced by abrasion.

The total pore volume and the average pore diameter were determined by way of mercury intrusion using a contact angle of 140°.

TABLE 1

Physical properties of catalysts and aluminas obtained in Examples 1 and 2 and Comparative Examples 1 and 2.

|  |  | Total PV (ml/g) | APD (nm) | % PV (>100 nm) | Difference in density between core and shell | Wear rate (%) |
|---|---|---|---|---|---|---|
| Ex. 1 | A | 0.88 | 20 | 18 | no | <0.1 |
| Ex. 2 | B | 0.78 | 20 | 2 | no | <0.1 |
| C. Ex. 1 | C | 0.81 | 20 | 18 | yes | 2.5 |
| C. Ex. 2 | D | 0.87 | 16.5 | 20 | yes | 2.0 |

Catalysts A and B, which show a homogeneous density distribution, both have a wear rate below 0.1 wt. %. In contrast, Comparative Aluminas C and D of which transmission electron micrographs show that the surface portion of the particles is denser than the core portion, with macropores with a diameter of about one micron and a direction in line with the circumference of the particle being present, show a high wear rate. It appears that the worn material was produced by peeling the surfaces off grains.

For catalyst performance evaluation, the desulfurization conversion rate and the demetallization conversion rate of Arab Medium long residuum in a fixed bed reactor were evaluated under the following conditions.

| Hydrogen partial pressure | 140 bar |
|---|---|
| Reaction temperature | 380 C. |
| Liquid hourly space velocity (LHSV) | 1.0 h-1 |
| Hydrogen/oil feed ratio | 800 Nl/l |

The feedstock was a Middle East long residuum with a sulfur content of 4–7%, a vanadium+nickel content of 150 ppm, a viscosity of 11.000 cSt, and a density at 15° C. of 1,010 g/ml.

Table 2 shows the pore size distribution and the HDS and HDM activities of the catalysts of the examples and comparative examples. All tested catalysts show no difference in density between the core portion of the catalyst particles and the shell portion. All catalysts have a wear rate below 0.1 wt. %.

TABLE 2

Pore size distribution and HDS and HDM activities of the catalysts of the examples and comparative examples

|  |  | PV (ml/g) | APD (nm) | % PV (>100 nm) | HDS(%) | HDM(%) |
|---|---|---|---|---|---|---|
| Ex. 1 | A | 0.88 | 20 | 18 | 60 | 51 |
| Ex. 2 | B | 0.78 | 20 | 2 | 62 | 50 |
| C. Ex. 3 | E | 0.70 | 14.3 | 15 | 65 | 40 |
| C. Ex. 4 | F | 0.70 | 31.2 | 15 | 42 | 47 |

HDS(%): Desulfurization conversion rate in hydrodesulfurization reaction.
HDM(%): Demetallization conversion rate in hydrodemetallization reaction.

Table 2 shows that catalysts A and B according to the invention show both a good hydrodesulfurization and hydrodemetallization activity. Catalysts D and E, which are not according to the invention because their APD is either to high or too low do not show both a good HDS and HDM activity.

What is claimed is:

1. A spherical catalyst composition comprising 1–7 wt. % of a Group VI metal component, calculated as an oxide, on a carrier, which catalyst has a particle size of 0.5–7 mm, a total pore volume of 0.5–1.3 ml/g, an average pore diameter of 15–30 nm, and a % PV(>100 nm) of 15–25%, there being substantially no difference in density between the core region of the carrier particles and their surface regions, wherein the catalyst additionally contains 0.5 to 3 wt. % of phosphorus, calculated as $P_2O_5$.

2. The catalyst of claim 1 which has a particle size of 2–7 mm and an average pore diameter of 17–25 nm.

3. The catalyst of claim 1 having a wear rate of less than 0.5 wt. %.

4. The catalyst of claim 3 having a wear rate of less than 0.1 wt. %.

5. The catalyst of claim 1 comprising 0.1–3 wt. % of a Group VIII metal component, calculated as an oxide.

6. The catalyst of claim 5 comprising 0.1–2.5 wt. % of a Group VIII metal component, calculated as an oxide.

7. A process for the hydroprocessing of metals-containing feedstocks in which a metals-containing feedstock is contacted at a temperature of 300–450° C., a hydrogen partial pressure of 20–220 bar, and a liquid hourly space velocity of 0.1–10 h-1 with the catalyst of claim 1.

8. The process of claim 7 which is a moving bed process or an ebullated bed process.

9. A spherical catalyst carrier, which has a particle size of 0.5–7 mm, a total pore volume of 0.5–1.3 ml/g, an average pore diameter of 15–30 nm, and a % PV(>100 nm) of 15–25%, and contains 0.5 to 3 wt. % of phosphorus, calculated as $P_2O_5$, based on the weight of the catalyst composition to be prepared based on said carrier, there being substantially no difference in density between the core region of the carrier particles and their surface regions.

10. The catalyst carrier of claim 9 which has a particle size of 2–7 mm and an average pore diameter of 17–25 nm.

11. The catalyst carrier of claim 9 which has a wear rate of less than 0.5 wt. %.

12. The catalyst carrier of claim 11 which has a wear rate of less than 0.1 wt. %.

13. A spherical catalyst composition comprising 1–7 wt. % of a Group VI metal component, calculated as an oxide, and a Group VIII metal component on a carrier, which catalyst has a particle size of 0.5–7 mm, a total pore volume of 0.5–1.3 ml/g, an average pore diameter of 15–30 nm, and a % PV(>100 nm) of 15–25%, there being substantially no difference in density between the core region of the carrier particles and their surface regions, there being no phosphorus present in said composition.

14. The catalyst of claim 13 which has a particle size of 2–7 mm and an average pore diameter of 17–25 nm.

15. The catalyst of claim 13 having a wear rate of less than 0.5 wt. %.

16. The catalyst of claim 15 having a wear rate of less than 0.1 wt. %.

17. The catalyst of claim 13 comprising 0.1–3 wt. % of a Group VIII metal component, calculated as an oxide.

18. The catalyst of claim 17 comprising 0.1–2.5 wt. % of a Group VIII metal component, calculated as an oxide.

* * * * *